US008678552B2

(12) United States Patent
Kang

(10) Patent No.: US 8,678,552 B2
(45) Date of Patent: Mar. 25, 2014

(54) NOZZLE PLATE AND METHOD OF MANUFACTURING THE SAME

(75) Inventor: Sung-gyu Kang, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 135 days.

(21) Appl. No.: 13/093,409

(22) Filed: Apr. 25, 2011

(65) Prior Publication Data

US 2012/0120153 A1 May 17, 2012

(30) Foreign Application Priority Data

Nov. 17, 2010 (KR) ........................ 10-2010-0114560

(51) Int. Cl.

*B41J 2/14* (2006.01)
*B41J 2/16* (2006.01)
*B21D 53/76* (2006.01)
*B23P 17/00* (2006.01)

(52) U.S. Cl.

USPC ............................................ 347/47; 29/890.1

(58) Field of Classification Search

USPC ............................................................ 347/47

See application file for complete search history.

(56) References Cited

U.S. PATENT DOCUMENTS

| | | | | |
|---|---|---|---|---|
| 7,449,283 | B2 * | 11/2008 | Nishi et al. | 430/320 |
| 7,513,041 | B2 * | 4/2009 | Ito et al. | 29/890.1 |
| 7,922,289 | B2 * | 4/2011 | Lee et al. | 347/47 |
| 2006/0017782 | A1 | 1/2006 | Nishi et al. | |

FOREIGN PATENT DOCUMENTS

| | | | |
|---|---|---|---|
| JP | 05-293960 | A | 11/1993 |
| JP | 2001260361 | A | 9/2001 |
| JP | 2002127430 | A | 5/2002 |
| JP | 2002321356 | A | 11/2002 |
| JP | 2007203650 | A | 8/2007 |
| JP | 2008001072 | A | 1/2008 |
| JP | 2008238485 | A | 10/2008 |
| KR | 20090037119 | A | 4/2009 |
| KR | 20100060276 | A | 6/2010 |

* cited by examiner

*Primary Examiner* — Matthew Luu
*Assistant Examiner* — Renee I Wilson
(74) *Attorney, Agent, or Firm* — Harness, Dickey & Pierce, P.L.C.

(57) ABSTRACT

A nozzle plate including protruding nozzles and a method of manufacturing the nozzle plate. The nozzle plate may include a body unit and at least one nozzle protruding from the body unit. The at least one nozzle may include an exit part having a constant cross-sectional area and a damper part having a cross-sectional area that decreases in a direction toward the exit part, wherein the damper part of the at least one nozzle includes a plurality of inner wall surfaces having different angles of inclination.

31 Claims, 12 Drawing Sheets

NOZZLE PLATE AND METHOD OF MANUFACTURING THE SAME

CROSS-REFERENCE TO RELATED APPLICATIONS

This application claims priority under 35 USC §119 to Korean Patent Application No. 10-2010-0114560, filed on Nov. 17, 2010, in the Korean Intellectual Property Office (KIPO), the entire contents of which are incorporated herein by reference.

BACKGROUND

1. Field

Example embodiments relate to nozzle plates and methods of manufacturing the same, and more particularly, to a nozzle plate including protruding nozzles and a method of manufacturing the nozzle plate.

2. Description of the Related Art

Inkjet printing is the technology of printing an image by ejecting fine droplets of ink onto desired portions of a printing medium via nozzles in a nozzle plate. Inkjet printing technologies currently have increasing applications beyond image printing, for example, in printable electronics, biotechnologies, bioscience, and the like. For example, a flexible substrate, besides a glass substrate, may be used to fabricate electronic circuits, and thus, the inkjet printing technology may be applied in the field of flexible display apparatuses. Such inkjet printing enables the formation of a pattern using just one process, and thus may lower manufacturing costs as compared to photolithography processes.

Inkjet printing technologies may be classified into either a thermal printing technology or a piezoelectric printing technology. The thermal printing technology involves generating bubbles by using a heat source and ejecting droplets of ink by expanding the bubbles. Meanwhile, the piezoelectric printing technology ejects droplets of ink by using a piezoelectric transformation. For an inkjet printing technology to be applied in printable electronics, biotechnologies, bioscience, and the like, each droplet of ink ejected from nozzles is required to have a small volume and to reach an exact target position. However, general inkjet printing technologies such as thermal printing or piezoelectric printing have technical limitations for use in printable electronics, such as a low accuracy in drop positioning and large volumes of droplets.

To address these limitations, an electro-hydrodynamic printing technology of ejecting droplets by using an electrostatic force has been developed. This electro-hydrodynamic printing may advantageously lead to droplets having smaller volumes, as compared with general thermal printing and piezoelectric printing. Recently, a hybrid printing technology in which piezoelectric and electro-hydrodynamic printing technologies are combined is being developed. Such hybrid printing ensures that multiple nozzles are individually driven, and thus are suitable for industrial fine-line printing. In this regard a nozzle plate with protruding nozzles that are robust and may enhance electric field convergence is required for electro-hydrodynamic printing and hybrid printing.

SUMMARY

Example embodiments provide nozzle plates having at least one protruding nozzle and methods of manufacturing the nozzle plates.

In accordance with example embodiments, a nozzle plate may include a body unit and at least one nozzle protruding from the body unit. In example embodiments, the at least one nozzle may include an exit part having a constant cross-sectional area and a damper part having a cross-sectional area that decreases in a direction toward the exit part. In addition, the damper part of the at least one nozzle may include a plurality of inner wall surfaces having different angles of inclination.

In accordance with example embodiments, a method of manufacturing a nozzle plate may include providing a substrate, forming a damper groove in the substrate, etching a portion of the substrate near the damper groove to form a damper part of at least one nozzle, forming an exit part of the at least one nozzle in a lower part of the substrate, and etching a portion of the substrate around the exit part of the at least one nozzle to form trenches. In example embodiments, the damper groove may extend from an upper surface of the substrate towards a lower surface of substrate. Furthermore, the damper part may be formed to have a cross-sectional area that decreases in a direction toward a lower region of the substrate and the damper part may be formed to include a plurality of inner wall surfaces having different angles of inclination. In example embodiments, the exit part may be formed to have a constant cross-sectional area.

In accordance with example embodiments, a method of manufacturing a nozzle plate may include providing a substrate, forming a damper part of at least one nozzle in the substrate, forming an exit part of the at least one nozzle in a lower part of the substrate to have a constant cross-sectional area and to contact the damper part, and etching a portion of the substrate around the exit part of the at least one nozzle to form trenches. In example embodiments, the damper part may be formed to extend from an upper surface of the substrate towards a lower region of the substrate, the damper part being formed to have a cross-sectional area that decreases in a direction toward the lower region of the substrate.

In accordance with example embodiments, a nozzle plate may include a body unit and at least one nozzle configured to protrude from the body unit. In example embodiments, the at least one nozzle may include an exit part having a constant cross-sectional area and a damper part having a cross-sectional area that decreases in a direction toward the exit part, wherein the damper part of the at least one nozzle includes a plurality of inner wall surfaces having different angles of inclination.

The angles of inclination of the inner wall surfaces of the damper part with respect to a surface of the body unit may increase in a direction toward the exit part of the at least one nozzle. The at least one nozzle may include a nozzle wall having a thickness that increases in a direction away from the exit part of the nozzle.

The damper part may include a first damper, and a second damper extending from the first damper toward the exit part of the at least one nozzle, and the inner wall surfaces of the first and second dampers respectively may have first and second angles of inclination with respect to a surface of the body unit, the second angle of inclination being larger than the first angle of inclination.

The second damper may contact the exit part of the at least one nozzle. The exit part of the at least one nozzle may have a diameter of about 10 μm to about 50 μm.

The damper part may further include a third damper extending from the second damper toward the exit part of the at least one nozzle, the third damper may have a cross-sectional area that decreases in a direction toward the exit part. The exit part of the at least one nozzle may have a diameter of about 5 μm to about 15 μm.

The body unit and the at least one nozzle wall may include silicon. Surfaces of the body unit and the nozzle wall may be coated with a protecting layer.

In accordance with example embodiments, a method of manufacturing a nozzle plate may include providing a substrate, forming a damper groove in an upper surface of the substrate to a predetermined depth, etching a portion of the substrate near the damper groove to form a damper part of at least one nozzle that has a cross-sectional area that decreases in a direction toward a lower region of the substrate and includes a plurality of inner wall surfaces having different angles of inclination, forming an exit part of the at least one nozzle in a lower surface of the substrate to a predetermined depth to have a constant cross-sectional area, and etching a portion of the substrate around the exit part of the at least one nozzle to form trenches.

The forming of the damper groove in the upper surface of the substrate may include forming a first mask having a first through hole on the upper surface of the substrate, forming a second mask having a second through hole that is smaller than the first through hole of the first mask on the upper surface of the substrate to cover the first mask, and vertically etching a portion of the upper surface of the substrate that is exposed through the second through hole of the second mask to a predetermined depth to form the damper groove.

The forming of the damper part may include removing the second mask, and taper-etching the portion of the substrate that is exposed through the first through hole of the first mask to form the damper part including the plurality of inner wall surfaces having different angles of inclination. The etching of the portion of the upper surface of the substrate to form the damper groove and the etching of the portion of the substrate near the damper groove to form the damper part may be performed by plasma dry etching.

The forming of the exit part of the at least one nozzle may include forming a third mask having a third through hole on the lower surface of the substrate in such a manner that the third through hole corresponds to the exit part of the at least one nozzle, forming a protecting layer to cover a portion of the lower surface of the substrate that is exposed around the third mask, and vertically etching a portion of the lower surface of the substrate that is exposed through the third through hole of the third mask to a predetermined depth to form the exit part of the at least one nozzle. The third mask may have a shape in which distances from a center of the third mask to edges of the third mask in different directions vary.

The method may further include forming a third damper after the forming of the exit part of the at least one nozzle, wherein the third damper may contact the exit part and the second damper and may have a cross-sectional area that increases in a direction toward the second damper. The forming of the third damper may include forming a fourth mask on the lower surface of the substrate to expose a bottom surface of the exit part of the at least one nozzle and etching the exposed bottom surface of the exit part to form a third damper in the lower surface of the substrate.

The forming of the trenches may include removing the protecting layer and forming a fifth mask on the third mask to cover the exit part of the at least one nozzle and etching a portion of the substrate that is exposed around the third mask to a predetermined depth to form the trenches. The method may further include, after the forming of the trenches, forming a protecting layer on the surfaces of the substrate and the inner wall surfaces and an outer wall surface of the at least one nozzle.

In accordance with example embodiments, a method of manufacturing a nozzle plate may includes providing a substrate, forming a damper part of at least one nozzle in an upper surface of the substrate to have a cross-sectional area that decreases in a direction toward a lower region of the substrate, forming an exit part of the at least one nozzle in a lower surface of the substrate to have a constant cross-sectional area and to contact the damper part, and etching a portion of the substrate around the exit part of the at least one nozzle to form trenches.

In example embodiments, the exit part may have a diameter of about 50 μm or greater.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
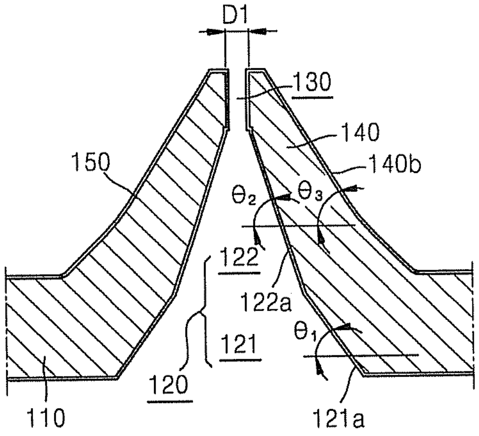
FIG. 1 is a cross-sectional view of a nozzle plate according to example embodiments.

Example embodiments will be described more fully hereinafter with reference to the accompanying drawings, in which example embodiments are shown. The present invention may, however, be embodied in many different forms and should not be construed as limited to the example embodiments set forth herein. Rather, example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being “on”, “connected to” or “coupled to” another element or layer, it can be directly on, connected or coupled to the other element or layer or intervening elements or layers that may be present. In contrast, when an element is referred to as being “directly on”, “directly connected to” or “directly coupled to” another element or layer, there are no intervening elements or layers present. Like numerals refer to like elements throughout. As used herein, the term “and/or” includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as “beneath”, “below”, “lower”, “above”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing example embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view of a nozzle plate according to example embodiments. Although only one nozzle is illustrated in FIG. 1, the nozzle plate of FIG. 1 may include a plurality of nozzles. This also applies to the other drawings.

Referring to FIG. 1, the nozzle plate may include a body unit 110 and at least one nozzle shaped to protrude from the body unit 110. The body unit 110 and a nozzle wall 140 of the nozzle may include silicon. An example of the silicon may be, but is not limited to, silicon with a <100>, <111>, or <110> crystalline direction. The nozzle may include an exit part 130 having a constant cross-sectional area, and a damper part 120 extending from the exit part 130 toward the body unit 110 to have a cross-sectional area that decreases in a direction toward the exit part 130. The exit part 130 of the nozzle may have a diameter D1 of about 10 μm to about 50 μm. However, this diameter range is exemplary, and the exit part 130 may have any of various diameters not within this range. An inner wall surface of the exit part 130 may have a circular or polygonal cross-section.

The damper part 120 may have inner wall surfaces 121*a* and 122*a* each having a different angle of inclination. The inner wall surfaces 121*a* and 122*a* may each have an angle of inclination with respect to a surface of the body unit 110 that increases in a direction toward the exit part 130. The damper part 120 may include a first damper 121 near the body unit 110, and a second damper 122 extending from the first damper 121 toward the exit part 130. The second damper 122 may extend to contact the exit part 130. The inner wall surface 121*a* of the first damper 121 may have a first angle ($\theta_1$) of inclination with respect to the surface of the body unit 110. The inner wall surface 122*a* of the second damper 122 may have a second angle ($\theta_2$) of inclination greater than the first angle ($\theta_1$) of inclination, with respect to the surface of the body unit 110. For example, when the body unit 110 is formed of a silicon substrate with a <100> crystalline direction, the first angle ($\theta_1$) of inclination may be about 57 degrees, and the second angle ($\theta_2$) of inclination may be about 72 degrees. However, these angles are exemplary. The first and second angles ($\theta_1$) and ($\theta_2$) of inclination may be varied. The inner wall surfaces 121*a* and 122*a* respectively of the first and second dampers 121 and 122 may each have a circular or polygonal cross-section.

The nozzle wall 140 may have a thickness that increases in a direction away from the exit part 130 of the nozzle. In particular, the second angle ($\theta_2$) of inclination of the inner wall surface of the damper part 120, and in particular, the inner wall surface 122*a* of the second damper 122, at a given height with respect to the surface of the body unit 110 may be greater than a third angle ($\theta_3$) of inclination of an outer wall surface 140*b* of the nozzle at the same height with respect to the surface of the body unit 110. Accordingly, the thickness of the nozzle wall 140 may increase in a direction away from the exit part 130 of the nozzle. The outer wall surface 140*b* of the nozzle may have a circular cross-section or a polygonal cross-section, for example, an octagonal cross-section, in the exit part 130.

The surfaces of the body unit 110 and the nozzle wall 140 may be coated with a protecting layer 150. The protecting layer 150 may include thermal $SiO_2$ or tetraethyl orthosilicate (TEOS) oxide. However, aspects of the present invention are not limited thereto. The protecting layer 150 may be formed of a different material. Although not illustrated in FIG. 1, protrusions may extend in edge regions of the body unit 110 to the same height as the nozzle. These protrusions may protect the protruding nozzle from being broken.

As described above, in the nozzle plate according to example embodiments, the damper part 120 of the nozzle may include the inner wall surfaces 121*a* and 122*a* each having an angle of inclination with respect to the surface of the body unit 110 that increases in a direction toward the exit part 130. In addition, the nozzle wall 140 may have a thickness that increases in a direction away from the exit part 130). Since the thickness of the nozzle wall 140 decreases toward the exit part 130 of the nozzle and increases away from the exit part 130 of the nozzle, an electric field convergence effect may be enhanced, and a mechanical hardness of the nozzle may be increased. Thus, an inkjet head including the nozzle plate may have a lower driving voltage due to the enhanced electric field convergence effect and may eject droplets having smaller volumes in a relatively straight manner. The increased mechanical strength may enable an increase of a nozzle length, which may further improve the electric field convergence effect. In addition, since the inner wall surface 122*a* of the second damper 122, which may be in direct contact with the exit part 130 of the nozzle, may have a larger angle of inclination than the inner wall surface 121 a of the first damper 121, a pitch between adjacent nozzles may be reduced.

Figure 2:
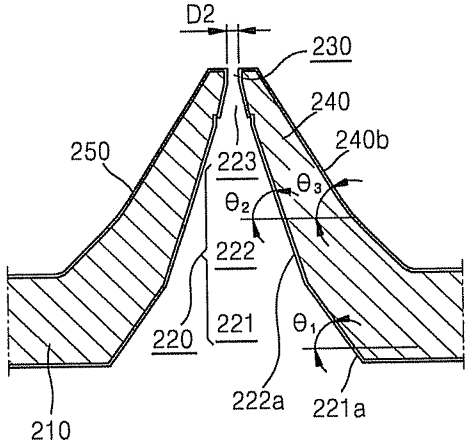
FIG. 2 is a cross-sectional view of a nozzle plate according to example embodiments.

FIG. 2 is a cross-sectional view of a nozzle plate according to example embodiments. The following description on the nozzle plate of FIG. 2 will focus on features that differ from those of the nozzle plate illustrated in FIG. 1.

Referring to FIG. 2, the nozzle plate may include a body unit 210 and at least one nozzle shaped to protrude from the body unit 210. The nozzle may include an exit part 230 having a constant cross-sectional area, and a damper part 220 extending from the exit part 230 toward the body unit 210 to have a cross-sectional area that decreases in a direction toward the exit part 230. The exit part 230 may have a diameter D2 as small as about 5 μm to about 15 μm. However, this diameter range is exemplary, and the exit part 120 may have any of various diameters not within this range.

The damper part 220 may include at least two inner wall surfaces 221*a* and 222*a* each having a different angle of inclination with respect to a surface of the body unit 210. The damper part 220 may include a first damper 221 near the body unit 210, a second damper 222 extending from the first damper 221 toward the exit part 230, and a third damper 223 extending from the second damper 222 toward the exit part 230. The third damper 223 may extend to contact the exit part 230. The inner wall surface 221*a* of the first damper 221 may have a first angle ($\theta_1$) of inclination with respect to the surface of the body unit 210. The inner wall surface 222*a* of the second damper 222 may have a second angle ($\theta_2$) of inclination greater than the first angle ($\theta_1$) of inclination, with respect to the surface of the body unit 210. The third damper 223 may have a cross-sectional area that decreases in a direction away from the second damper 222 towards the exit part 230. The third damper 223 may prevent or reduce an increase in flow resistance at the exit part 230 of the nozzle that may be caused due to the relatively small diameter of the exit part 230.

A nozzle wall 240 of the nozzle may have a thickness that increases in a direction away from the exit part 230. In particular, the second angle ($\theta_2$) of inclination of the inner wall surface of the damper part 220, and in particular, the inner wall surface 222*a* of the second damper 222, at a given height with respect to the surface of the body unit 210 may be greater than a third angle ($\theta_3$) of inclination of an outer wall surface 240*b* of the nozzle at the same height with respect to the surface of the body unit 210. The surfaces of the body unit 210 and the nozzle wall 240 may be coated with a protecting layer 250. The protecting layer 250 may include, but are not limited to, thermal $SiO_2$ or TEOS oxide.

FIGS. 3 to 9 are views for describing a method of manufacturing the nozzle plate of FIG. 1, according to example embodiments.

Figure 3:
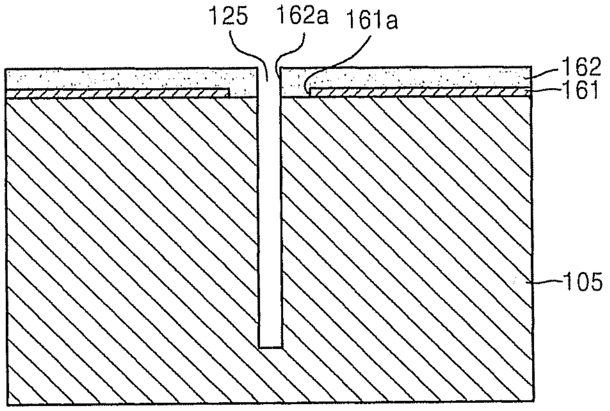
FIGS. 3 to 9 are views for describing a method of manufacturing the nozzle plate of FIG. 1, according to example embodiments.

Referring to FIG. 3, a substrate 105 having a thickness is provided. In example embodiments, the thickness may or may not be predetermined. In example embodiments, the substrate 105 may have a thickness of about 700 μm. The substrate 105 may be, for example, a silicon substrate with a <100> crystalline direction. However, aspects of the present invention are not limited thereto. For example, the substrate 105 may be a silicon substrate with a <111> or <110> crystalline direction. In another example, the substrate 105 may be a non-silicon substrate. After a first mask 161 having a first through hole 161*a* is formed on an upper surface of the substrate 105, a second mask 162 having a second through hole 162*a* that is smaller than the first through hole 161*a* is formed to cover the first mask 161. For example, the first through hole 161*a* may have, but is not limited to, a diameter of about 10 μm to about 50 μm. The first mask 161 may be formed of thermal oxide, and the second mask 162 may be formed of photoresist. However, aspects of the present invention are not limited thereto. The first and second masks 161 and 162 may be formed of any of various suitable materials.

In example embodiments, a portion of the upper surface of the substrate 105 that is exposed through the second through hole 162 of the mask 162 may be vertically etched to a depth to form a damper groove 125. In example embodiments, the depth may or may not be predetermined. The depth of the damper groove 125 may be slightly smaller than that of the damper part 120, which will be formed in a later process that will be described below. The damper groove 125 may contribute to forming the inner wall surfaces 121*a* and 122*a* of the damper part 120 having different angles of inclination in a process of forming the damper part 120, which will be described later. The damper groove 125 may be formed by dry etching, and in one embodiment, by plasma dry etching. However, aspects of the present invention are not limited thereto. Subsequently, the second mask 162 on the first mask 161 is removed.

Figure 4:
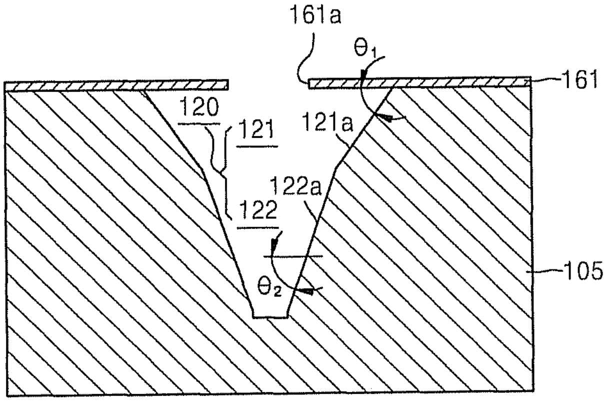

Referring to FIG. 4, the upper surface of the substrate 105 may be taper-etched through the first through hole 161*a* of the first mask 161 to form the damper part 120 of the nozzle. The damper part 120 may have a shape with a cross-sectional area that decreases in a direction toward a bottom of the substrate 105. Due to the taper-etching process, the inner wall surfaces 121*a* and 122*a* of the damper part 120 may have different angles of inclination. In particular, the damper part 120 may include the first damper 121 formed in an upper portion of the substrate 105, and the second damper 122 extending from the first damper 121 toward a lower region of the substrate 105. The inner wall surface 121*a* of the first damper 121 may be formed to have a first angle ($\theta_1$) of inclination, and the inner wall surface 122*a* of the second damper 121 may be formed to have a second angle ($\theta_2$) of inclination, both with respect to the upper surface of the substrate 105. The taper-etching process may be performed by dry etching, and in some embodiments, by plasma dry etching. However, aspects of the present invention are not limited thereto. In example embodiments, a bottom of the damper groove 125 may also be etched during the tapered-etching process to form the damper part 120 having a depth that may or may not be predetermined.

A process of forming the inner wall surfaces 121*a* and 122*a* having different angles of inclination by using taper-etching will now be described below.

In example embodiments, when taper-etching begins, the upper portion of the substrate 105 underneath the first mask 161 may be primarily etched to form the inner wall surface 121*a* having the first angle ($\theta_1$) of inclination. After the primary etching, portions of the substrate 105 below the inner wall surface 121*a* having the first angle ($\theta_1$) of inclination and near the damper groove 125 may be secondarily etched. After the secondary etching is completed, the inner wall surface 122*a* having the second angle ($\theta_2$) of inclination, which is larger than the first angle ($\theta_1$) of inclination, is formed. Therefore, as described above, the first and second dampers 121 and 122, which respectively have the inner wall surfaces 121*a* and 122*a* having different angles of inclination, may be formed by performing the taper-etching process. In example embodiments, the first mask 161 may be removed from the upper surface of the substrate 105.

Figure 5:
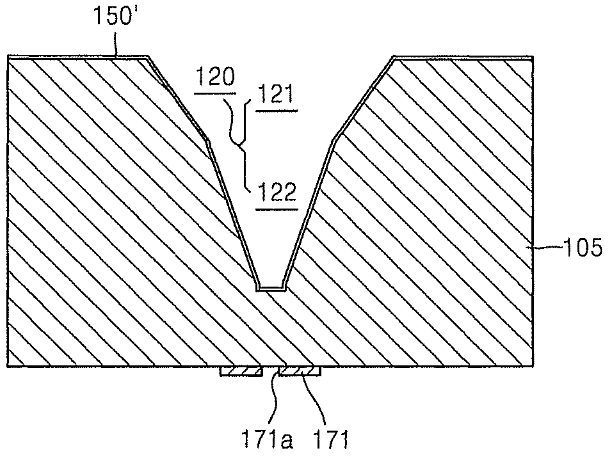

Referring to FIG. 5, a first protecting layer 150' may be formed on the upper surface of the substrate 105 and the inner wall surfaces 121_a_ and 122_a_ of the damper part 120. In example embodiments, the first protecting layer 150' may be formed of, but is not limited to, thermal $SiO_2$or TEOS oxide. In example embodiments, an additional step of processing the substrate 105 to a thickness, which may or may not be predetermined, may be performed to obtain a desired nozzle length. In example embodiments, a third mask 171 having a third through hole 171_a_ may be formed having a shape on a lower surface of the substrate 105. In example embodiments, the shape may or may not be predetermined. The third mask 171 is for forming the exit part 130 of the nozzle and trenches 190, which will be described later. For example, the third mask 171 may be formed of, but is not limited to, at least one of thermal $SiO_2$ and TEOS oxide. The third through hole 171 a may have a shape corresponding to the exit part 130 of the nozzle.

Figure 6:
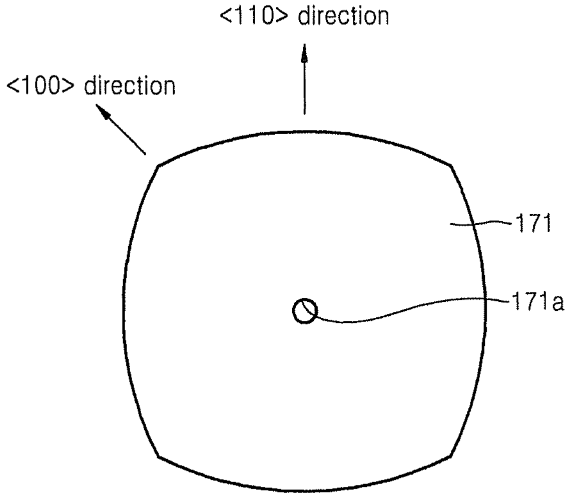

For example, the third mask 171 may have a circular or polygonal shape or may have any of various shapes. FIG. 6 illustrates a third mask 171 according to example embodiments. Referring to FIG. 6, the third mask 171 may have a mixed shape formed of circular and rectangular shapes. In particular, the third mask 171 may have a shape in which a distance from a center of the third mask 171 to an edge in a <110> direction is shorter than that to an edge in a <100> direction. When the substrate 105 is a silicon substrate with a <100> crystalline direction, the substrate 105 may be etched in a <110> direction at a lower rate than in a <100> direction. Therefore, when the third mask 171 having a mixed shape formed of circular and rectangular shapes as illustrated in FIG. 6 is used, an outer wall surface 140_b_ (see FIG. 8) of the nozzle may have a polygonal shape, for example, an octagonal shape.

Figure 7:
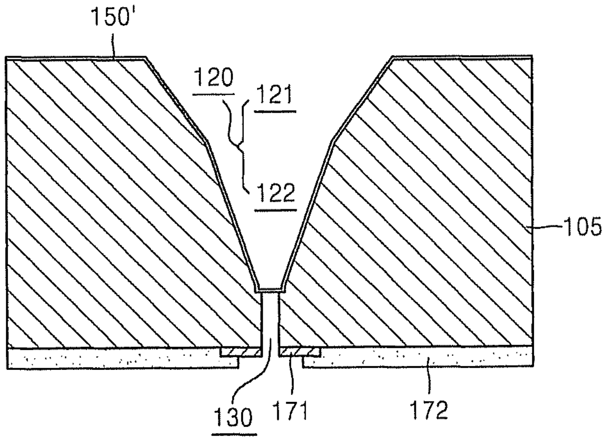

Referring to FIG. 7, a second protecting layer 172 may be formed on a portion of the lower surface of the substrate 105 that is exposed around the third mask 171. The second protecting layer 172 may protect the portion of the lower surface of the substrate 105 that is exposed around the third mask 171, during a process of forming the exit part 130, which will be described later. The second protecting layer 172 may be formed of photoresist. However, aspects of the present invention are not limited thereto. Subsequently, a portion of the lower surface of the substrate 105 that is exposed through the third through hole 171_a_ of the third mask 171 may be vertically etched to form the exit part 130 of the nozzle. The exit part 130 may be formed to have a space that has a constant cross-sectional area. The exit part 130 of the nozzle may have a diameter (D1 in FIG. 1) of about 10 μm to about 50 μm. However, this diameter range is exemplary, and the exit part 130 may have any of various diameters not within this range. The exit part 130 of the nozzle may be formed to contact the second damper 122. The exit part 130 may be formed by using dry etching, and in one embodiment, by using plasma dry etching. However, aspects of the present invention are not limited thereto. Subsequently, the second protecting layer 172 may be removed.

Figure 8:
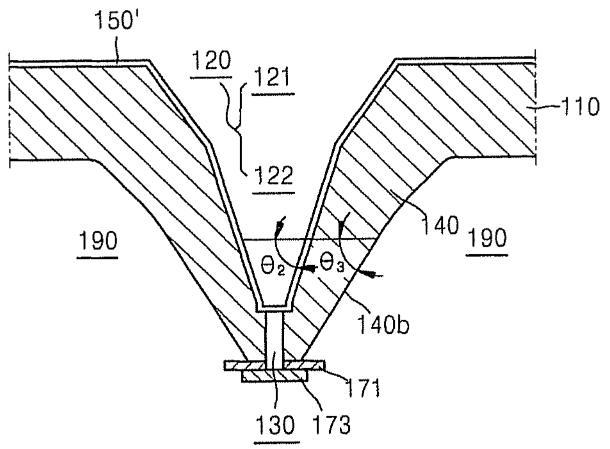

Referring to FIG. 8, a fourth mask 173 may be formed on the third mask 171 to cover the third through hole 171_a_. The fourth mask 173 is for protecting the exit part 130 of the nozzle during a trench forming process, which will be described later. In example embodiments the fourth mask 173 may be formed by laminating a dry film resist on the lower surface of the substrate 105 to cover the third mask 171, and patterning the dry film resist. In example embodiments, the portion of the lower surface of the substrate 105 that is exposed around the third mask 171 may be taper-etched to a depth to form the trenches 190. In example embodiments, the substrate 105 that is exposed around the third mask 171 may be taper-etched to a depth to form the trenches 190. In example embodiments, the depth may or may not be predetermined. By etching the substrate 105 as described above, the body unit 110 and the nozzle protruding from the body unit 110 may be formed. In the trench forming process, the nozzle wall 140 may be formed to have a thickness that increases in a direction away from the exit part 130 of the nozzle. That is, a third angle ($\theta_3$) of inclination of the outer wall surface 140_b_ of the nozzle at a given height with respect to the surface of the body unit 110 may be smaller than the second angle ($\theta_2$) of inclination of the inner wall surface of the damper part 120, and in particular, the inner wall surface 122_a_ of the second damper 122, at the same height with respect to the surface of the body unit 122_a_. The trenches 190 may be formed by using dry etching, and in one embodiment, by using plasma dry etching. However, aspects of the present invention are not limited thereto. In example embodiments, the third and fourth masks 171 and 173 may be removed.

Figure 9:
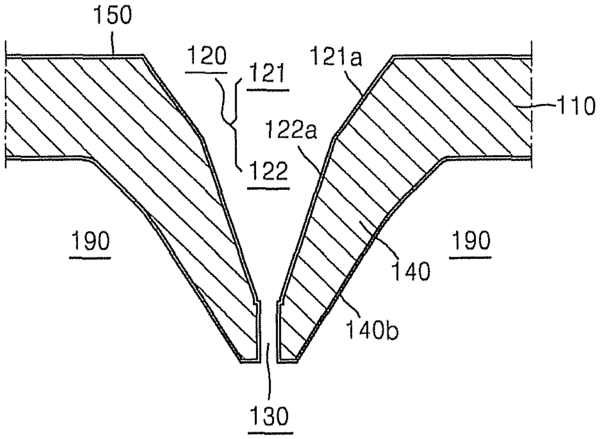

Referring to FIG. 9, the first protecting layer 150' is removed from the upper surface of the substrate 105 and the inner wall surfaces 121_a_ and 122_a_ of the damper part 120. In example embodiments, a third protecting layer 150 may be formed to cover all surfaces of the body unit 110 and the nozzle wall 140. For example, the third protecting layer 150 may be formed of, but is not limited to, thermal $SiO_2$ or TEOS oxide.

As described above, the nozzle plate may be manufactured by using plasma dry etching to include at least one nozzle of which the damper part 120 may have the inner wall surfaces 121_a_ and 122_a_ having different angles of inclination. The nozzle wall 140 of the nozzle may have a thickness that increases in a direction away from the exit part 130 of the nozzle.

FIGS. 10 to 17 are views for describing a method of manufacturing the nozzle plate of FIG. 2, according to example embodiments. The following description will focus on features that differ from those of the nozzle plate illustrated in FIG. 1.

Figure 10:
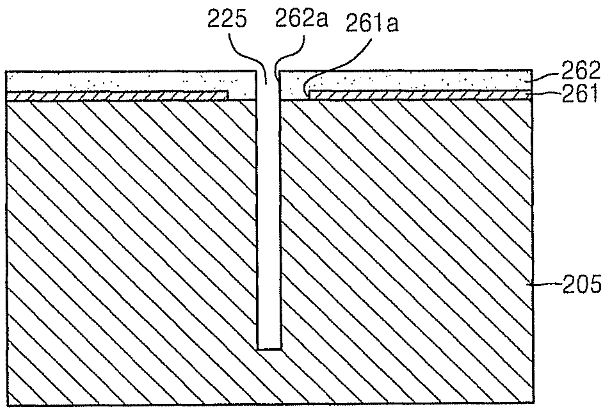
FIGS. 10 to 17 are views for describing a method of manufacturing the nozzle plate of FIG. 2, according to example embodiments.

Referring to FIG. 10, a substrate 205 may be prepared and first and second masks 261 and 262 may be sequentially formed on an upper surface of the substrate 205. The first mask 261 may have a first through hole 261_a_ that is larger than a second through hole 262_a_ of the second mask 262. For example, the first through hole 261_a_ may have, but is not limited to, a diameter of about 10 μm to about 50 μm. In example embodiments, a portion of the upper surface of the substrate 205 that is exposed through the second through hole 262_a_ of the second mask 262 may be vertically etched to a depth to form a damper groove 225. In example embodiments, the depth may or may not be predetermined. The damper groove 225 may be formed by dry etching, and in one embodiment, by plasma dry etching. However, aspects of the present invention are not limited thereto. Subsequently, the second mask 262 on the first mask 261 may be removed.

Figure 11:
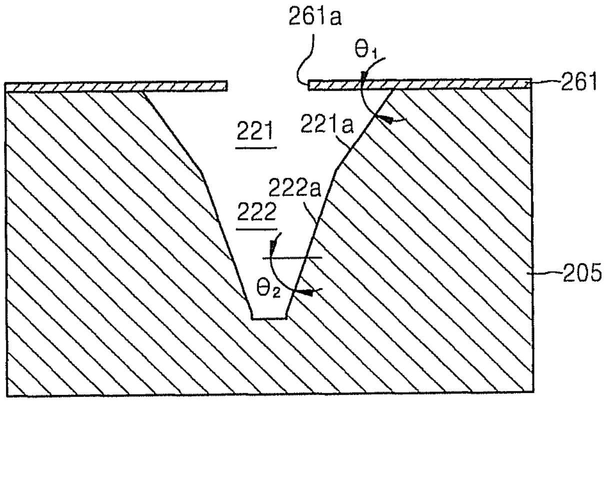

Referring to FIG. 11, the upper surface of the substrate 205 may be taper-etched through the first through hole 261_a_ of the first mask 261 to form the first and second dampers 221 and 222 of the nozzle. The first damper 221 may be formed in an upper portion of the substrate 205. The second damper 221 may extend from the first damper 221 toward a lower region of the substrate 205. The first and second dampers 221 and 222 may each enclose a space with a cross-sectional area that decreases in a direction toward a bottom of the substrate 205. Due to the taper-etching process, the first and second dampers 221 and 222 may respectively have the inner wall surfaces 221_a_ and 222_a_ each having a different angle of inclination. The inner wall surface 221_a_ of the first damper 221 may be formed to have a first angle ($\theta_1$) of inclination, and the inner wall surface 222*a* of the second damper 222 may be formed to have a second angle ($\theta_2$) of inclination, both with respect to the upper surface of the substrate 205. The taper-etching process may be performed by dry etching, and in some embodiments, by plasma dry etching. However, aspects of the present invention are not limited thereto. A detailed description on forming the first and second dampers 221 and 222 will not be provided here, since it has already been described in the previous embodiment. In example embodiments, the first mask 261 may be removed from the upper surface of the substrate 205.

Figure 12:
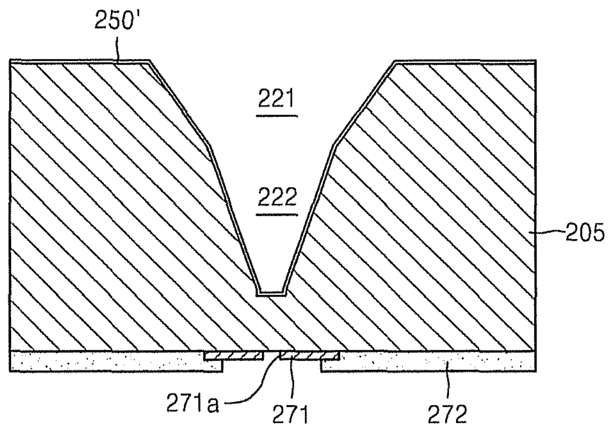

Referring to FIG. 12, a first protecting layer 250' may be formed on the upper surface of the substrate 205 and the inner wall surfaces 221*a* and 222*a* of the damper part 220. For example, the first protecting layer 250' may be formed of, but is not limited to, thermal $SiO_2$ or TEOS oxide. A third mask 271 having a third through hole 271*a* may be formed having a shape on a lower surface of the substrate 205. In example embodiments, the shape of the through hole 271*a* may or may not be predetermined. The third mask 271 is for forming the exit part 230 of the nozzle and trenches 290, which will be described later. The third through hole 271*a* may have a shape corresponding to the exit part 230 of the nozzle. For example, the third mask 271 may have a circular or polygonal shape or may have any of various shapes. For example, the third mask 271 may have a shape as illustrated in FIG. 6. Subsequently, a second protecting layer 271 may be formed on a portion of the lower surface of the substrate 205 that is exposed around the third mask 272. The second protecting layer 272 may protect the portion of the lower surface of the substrate 205 that is exposed around the third mask 271, during a process of forming the exit part 230, which will be described later.

Figure 13:
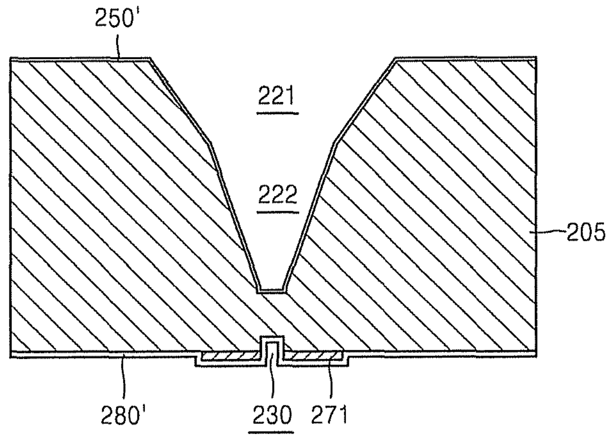

Referring to FIG. 13, a portion the lower surface of the substrate 205 that is exposed through the third through hole 271*a* of the third mask 271 may be vertically etched to form the exit part 230 having a depth. In example embodiments, the exit part 230 may or may not be formed to a predetermined depth. The exit part 230 may be formed to have a constant cross-sectional area. For example, the exit part 230 may have a diameter (D2 in FIG. 2) as small as about 5 μm to about 15 μm. However, this diameter range is exemplary, and the exit part 130 may have any of various diameters not within this range. The exit part 230 may be formed by using dry etching, and in one embodiment, by using plasma dry etching. However, aspects of the present invention are not limited thereto. In example embodiments, the second protecting layer 272 may be removed and a third protecting layer 280' may be formed to cover the lower surface of the substrate 205, the third mask 271, and an inner wall surface of the exit part 230. For example, the third protecting layer 280' may be formed of, but is not limited to, thermal $SiO_2$ or TEOS oxide.

Figure 14:
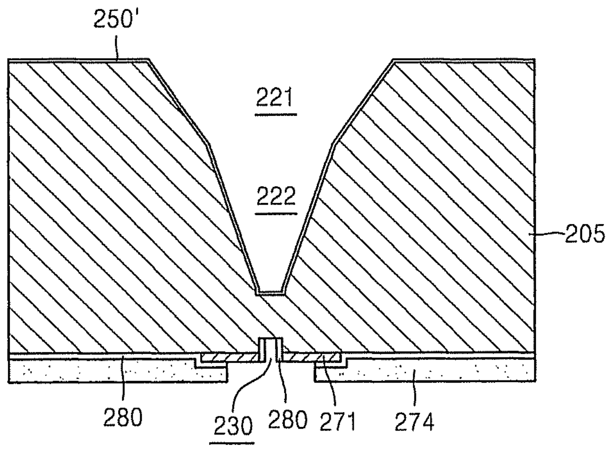

Referring to FIG. 14, a fourth protecting layer 274 may be formed on the third protecting layer 280' to expose the exit part 230 of the nozzle and the third protecting layer 280' may be etched by using the fourth protecting layer 274 as an etch mask. During the etching process, only a portion of the third protecting layer 280' on a bottom surface of the exit part 230 may be selectively removed, thus resulting in a fourth mask 280. In particular, when the third and fourth protecting layers 280' and 274 are each formed of, for example, thermal $SiO_2$ or TEOS oxide, the third protecting layer 280' may be etched by, for example, reactive ion etching (RIE), by using the fourth protecting layer 274 as an etch mask, wherein a portion of the third protecting layer 280' on the inner wall surface of the exit part 230 may be etched at a different rate from that on the bottom surface of the exit part 230. The difference in etch rate enables only the portion of the third protecting layer 280' on the bottom surface of the exit part 230 to be selectively removed. In example embodiments, the fourth protecting layer 274 may be removed.

Figure 15:
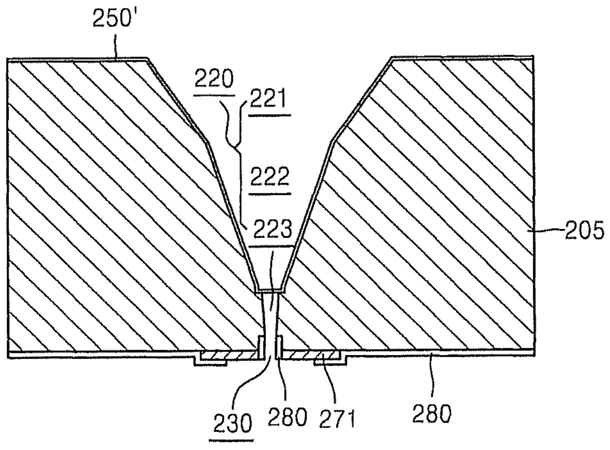

Referring to FIG. 15, the bottom surface of the exit part 230 may be etched using the fourth mask 280, which results from the etching of the third protecting layer 280', as an etch mask to form a third damper 223. The third damper 223 may be formed by dry etching, and in one embodiment, by plasma dry etching. However, aspects of the present invention are not limited thereto. The third damper 223 may have a shape with a cross-sectional area that increases in a direction toward to the second damper 222. The shape of the third damper 223 may prevent or reduce an increase in flow resistance that may occur due to the exit part 230 having a very small diameter. In example embodiments, the fourth mask 280 may be removed. For example, after the completion of the damper part 220, which includes the first, second, and third dampers 221, 222, and 223, the fourth mask 280 may be removed.

Figure 16:
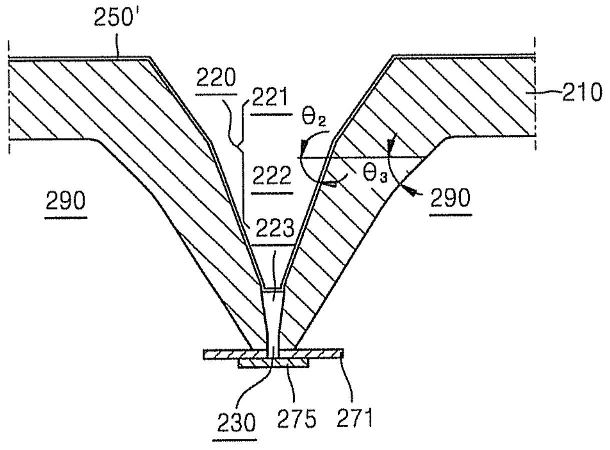

Referring to FIG. 16, a fifth mask 275 may be formed on the third mask 271 to cover the third through hole 271*a*. The fifth mask 275 is for protecting the exit part 230 of the nozzle during a trench forming process, which will be described later. Subsequently, the portion of the lower surface of the substrate 205 that is exposed around the third mask 271 may be taper-etched to a depth to form the trenches 290. In example embodiments, the portion of the lower surface of the substrate that is exposed around the third mask 271 may be taper-etched to a predetermined depth. By etching the substrate 205 as described above, the body unit 210 and the nozzle protruding from the body unit 210 may be formed. In the trench forming process, the nozzle wall 240 may be formed to have a thickness that increases in a direction away from the exit part 230 of the nozzle. That is, a third angle ($\theta_3$) of inclination of the outer wall surface 240*b* of the nozzle at a given height with respect to a surface of the body unit 210 may be smaller than an angle of inclination of the inner wall surface of the damper part 220 (for example, a second angle ($\theta_2$) of inclination) at the same height with respect to the surface of the body unit 210. The trenches 290 may be formed by using dry etching, and in one embodiment, by using plasma dry etching. However, aspects of the present invention are not limited thereto. Then, the third and fifth masks 271 and 275 may be removed.

Figure 17:
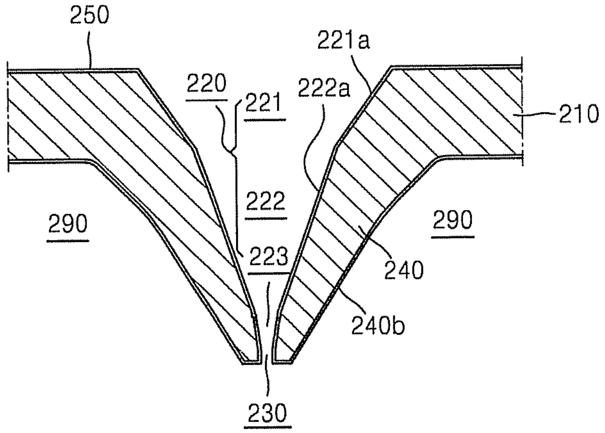

Referring to FIG. 17, a fifth protecting layer 250 may be formed to cover all surfaces of the body unit 210 and the nozzle wall 240. For example, the fifth protecting layer 250 may be formed after the first protecting layer 250' is removed from the upper surface of the substrate 205 and the inner wall surfaces 221*a* and 122*a* of the damper part 220. In example embodiments, the fifth protecting layer 250 may be formed of, but is not limited to, thermal $SiO_2$ or TEOS oxide.

As described above, when the exit part 230 has a very small diameter, the third damper 223 having a tapered shape may be further formed to connect the exit part 230 and the second damper 222. The third damper 223 may prevent or reduce an increase in flow resistance that may occur if the exit part 230 has a very small diameter.

FIGS. 18 to 22 are views for describing a method of manufacturing a nozzle plate, according to another embodiment of the present invention. The following description on the current embodiment will focus on aspects that differ from those of the previous embodiment.

Figure 18:
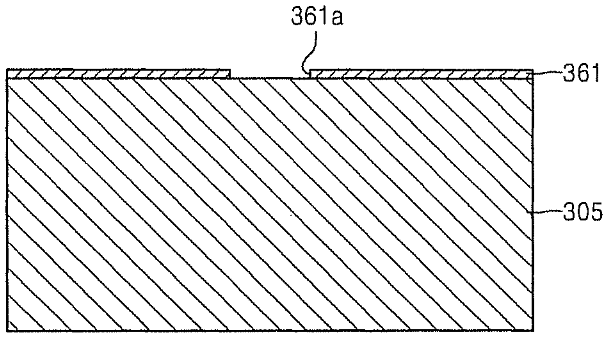
FIGS. 18 to 22 are views for describing a method of manufacturing a nozzle plate, according to example embodiments.
Figure 19:
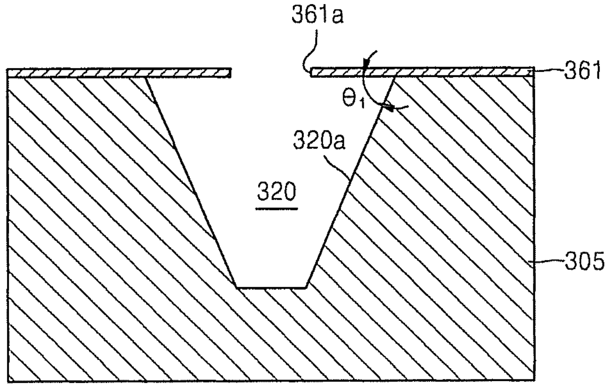

Referring to FIG. 18, after a substrate 305 is prepared, a first mask 361 having a first through hole 361*a* is formed on an upper surface of the substrate 305. For example, the first through hole 361*a* may have, but is not limited to, a diameter of about 50 μm or greater. However, this diameter is exemplary, and the first through hole 361*a* may have a different diameter. Referring to FIG. 19, a portion of the upper surface of the substrate 305 that is exposed through the first through hole 361*a* of the first mask 361 may be taper-etched to a depth to form a damper part 320. In example embodiments, a portion of the upper surface of the substrate 305 that is exposed through the first through hole 361*a* of the first mask 361 may be taper-etched to a predetermined depth. The damper part 320 may be formed to have an inner wall surface 320*a* having a first angle ($\theta_1$) of inclination with respect to the upper surface of the substrate 305. In example embodiments, the first mask 361 may be removed after forming the inner wall surface 320*a*.

Figure 20:
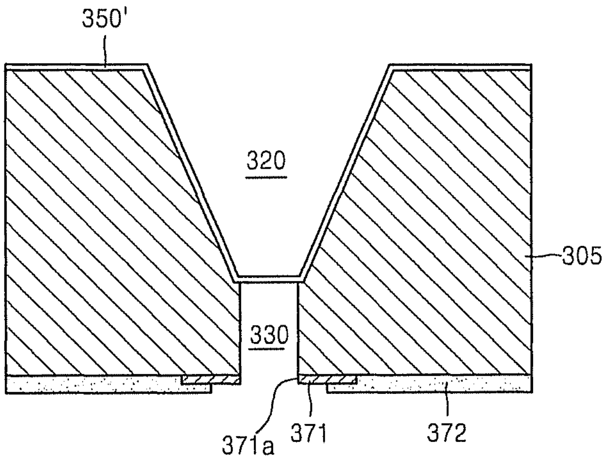

Referring to FIG. 20, a first protecting layer 350' may be formed on the upper surface of the substrate 305 and the inner wall surface 320*a* of the damper part 320. A second mask 371 having a second through hole 371*a* may be formed having a shape on a lower surface of the substrate 305. In example embodiments, the second through hole 371*a* may be formed to have a predetermined shape. The second mask 371 is for forming an exit part 330 of a nozzle and trenches 390, which will be described later. The second through hole 371*a* may have a shape corresponding to the exit part 330 of the nozzle. Subsequently, a second protecting layer 372 may be formed on a portion the lower surface of the substrate 305 that is exposed around the second mask 371. The second protecting layer 372 may protect the portion of the lower surface of the substrate 305 that is exposed around the second mask 371, during a process of forming the exit part 330, which will be described later.

In example embodiments, a portion of the lower surface of the substrate 305 that is exposed through the second through hole 371*a* of the second mask 371 may be vertically etched to form the exit part 330 of the nozzle. The exit part 330 may be formed to have a constant cross-sectional area. The exit part 330 of the nozzle may have a diameter (D3 in FIG. 22) of about 50 μm or greater. However, this diameter is exemplary, and the exit part 130 may have a different diameter. The exit part 330 of the nozzle may be formed to contact the damper part 320. The exit part 330 may be formed by using dry etching, and in one embodiment, by using plasma dry etching. However, aspects of the present invention are not limited thereto. In example embodiments, the second protecting layer 372 may be removed.

Figure 21:
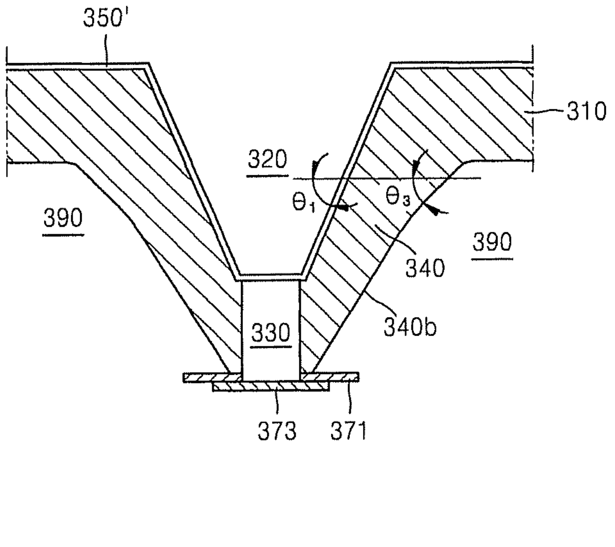

Referring to FIG. 21, a third mask 373 may be formed on the second mask 371 to cover the second through hole 371*a*. The third mask 373 is for protecting the exit part 330 of the nozzle during a trench forming process, which will be described later. In example embodiments, the portion of the lower surface of the substrate 305 that is exposed around the second mask 371 may be taper-etched to a depth to form the trenches 390. In example embodiments, the portion of the lower surface of the substrate 305 that is exposed around the second mask 371 may be taper-etched to a predetermined depth. By etching the substrate 305 as described above, the body unit 310 and the nozzle protruding from the body unit 310 may be formed. In the trench forming process, the nozzle wall 340 may be formed to have a thickness that increases in a direction away from the exit part 330 of the nozzle. That is, a third angle ($\theta_3$) of inclination of the outer wall surface 340*b* of the nozzle at a given height with respect to the surface of the body unit 310 may be smaller than a first angle ($\theta_1$) of inclination of the inner wall surface 320*a* of the damper part 320 at the same height with respect to the surface of the body unit 310. The trenches 390 may be formed by using dry etching, and in one embodiment, by using plasma dry etching. However, aspects of the present invention are not limited thereto. In example embodiments, the second and third masks 371 and 373 may be removed.

Figure 22:
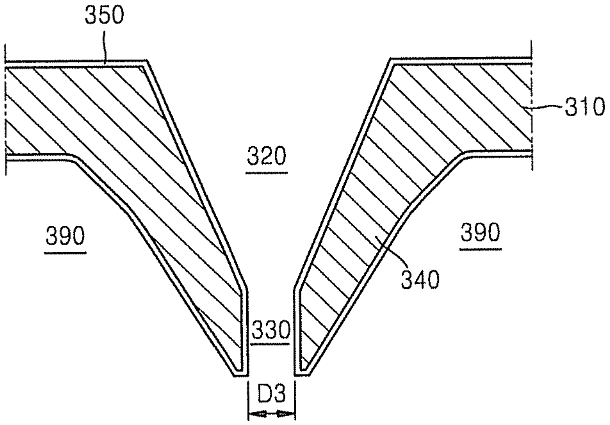

Referring to FIG. 22, the first protecting layer 350' may be removed from the upper surface of the substrate 305 and the inner wall surface 320 of the damper part 320 and a third protecting layer 350 may be formed to cover all surfaces of the body unit 310 and the nozzle wall 340.

As described above, when a nozzle has an exit part having a diameter D3, for example, as large as about 50 μm or greater, the damper part 320 may include the inner wall surface 320*a* having a constant angle of inclination. In addition, the nozzle wall 340 may have a thickness that increases in a direction away from the exit part 330 of the nozzle.

As described above, in accordance with example embodiments, a nozzle plate may include at least one protruding nozzle having varying nozzle wall thicknesses, wherein the nozzle is thinner nearer an exit part of the nozzle and is thicker nearer a body unit of the nozzle plate, that is, is thicker in a direction away from the exit part. Thus, the nozzle may have an improved electric field convergence effect and may have an enhanced mechanical hardness. The improved electric field convergence effect may enable a driving voltage of an inkjet head to be low and may enable each droplet of ink to be ejected having a reduced volume in a more straight manner. The enhanced mechanical strength of the nozzles allows a nozzle length to be increased, which may further enhance the electric field convergence effect. Furthermore, a damper part of each nozzle may be formed by using a method such as dry etching to have an inner wall surface with a larger angle of inclination toward the exit part thereof with respect to a surface of the body unit, and thus, a pitch between nozzles may also be reduced.

It should be understood that example embodiments described herein should be considered in a descriptive sense only and not for purposes of limitation. Descriptions of features or aspects within example embodiments should typically be considered as available for other similar features or aspects in other embodiments.

What is claimed is:

1. A nozzle plate comprising:

a body unit; and at least one nozzle protruding from the body unit, the at least one nozzle including an exit part having a constant cross-sectional area and a damper part having a cross-sectional area that decreases in a direction toward the exit part, wherein the damper part of the at least one nozzle includes a plurality of inner wall surfaces having different angles of inclination, the plurality of inner wall surfaces including a first inner wall surface having a first angle of inclination and a second inner wall surface having a second angle of inclination, the first and second inner wall surfaces meeting each other at a point.

2. The nozzle plate of claim 1, wherein the angles of inclination of the inner wall surfaces of the damper part with respect to a surface of the body unit increase in the direction toward the exit part of the at least one nozzle.

3. The nozzle plate of claim 1, wherein the at least one nozzle includes a nozzle wall having a thickness that increases in a direction away from the exit part of the at least one nozzle.

4. The nozzle plate of claim 1, wherein the damper part includes a first damper and a second damper extending from the first damper toward the exit part of the at least one nozzle, and inner wall surfaces of the first and second dampers respectively have the first and second angles of inclination with respect to a surface of the body unit, the second angle of inclination being larger than the first angle of inclination.

5. The nozzle plate of claim 4, wherein the second damper contacts the exit part of the at least one nozzle.

6. The nozzle plate of claim 5, wherein the exit part of the at least one nozzle has a diameter of about 10 μm to about 50 μm.

7. The nozzle plate of claim 4, wherein the damper part further includes a third damper extending from the second damper toward the exit part of the at least one nozzle, the third damper having a cross-sectional area that decreases in the direction toward the exit part of the at least one nozzle.

8. The nozzle plate of claim 7, wherein the exit part of the at least one nozzle has a diameter of about 5 μm to about 15 μm.

9. The nozzle plate of claim 3, wherein the body unit and the nozzle wall comprise silicon.

10. The nozzle plate of claim 3, wherein surfaces of the body unit and the nozzle wall are coated with a protecting layer.

11. A method of manufacturing a nozzle plate, the method comprising:

providing a substrate;

forming a damper groove in the substrate, the damper groove extending from an upper surface of the substrate towards a lower surface of substrate;

etching a portion of the substrate near the damper groove to form a damper part of at least one nozzle, the damper part being formed to have a cross-sectional area that decreases in a direction toward a lower region of the substrate, the damper part being formed to include a plurality of inner wall surfaces having different angles of inclination, the plurality of inner wall surfaces including a first inner wall surface having a first angle of inclination and a second inner wall surface having a second angle of inclination, the first and second inner wall surfaces meeting each other at a point;

forming an exit part of the at least one nozzle in a lower part of the substrate, the exit part being formed to have a constant cross-sectional area; and etching a portion of the substrate around the exit part of the at least one nozzle to form trenches.

12. The method of claim 11, wherein forming the damper groove in the upper surface of the substrate comprises:

forming a first mask having a first through hole on the upper surface of the substrate;

forming a second mask on the first mask, the second mask being formed to have a second through hole that is smaller than the first through hole of the first mask; and vertically etching a portion of the upper surface of the substrate that is exposed through the second through hole of the second mask to form the damper groove.

13. The method of claim 12, wherein forming the damper part comprises:

removing the second mask; and taper-etching the portion of the substrate near the damper groove to form the damper part comprising the plurality of inner wall surfaces having different angles of inclination.

14. The method of claim 13, wherein etching the portion of the upper surface of the substrate to form the damper groove and etching the portion of the substrate near the damper groove to form the damper part are performed by plasma dry etching.

15. The method of claim 13, wherein taper-etching the portion of the substrate near the damper groove forms a first damper and a second damper extending from the first damper toward the exit part of the at least one nozzle, the first damper and the second damper forming the damper part, and inner wall surfaces of the first and second dampers respectively are formed to have the first and second angles of inclination with respect to a surface of the substrate, the second angle of inclination being larger than the first angle of inclination.

16. The method of claim 15, wherein forming the exit part of the at least one nozzle comprises:

forming a third mask having a third through hole on the lower surface of the substrate in such a manner that the third through hole corresponds to the exit part of the at least one nozzle;

forming a protecting layer on a portion of the lower surface of the substrate that is exposed around the third mask; and vertically etching a portion of the lower surface of the substrate that is exposed through the third through hole of the third mask to form the exit part of the at least one nozzle.

17. The method of claim 16, wherein the third mask has a shape in which distances from a center of the third mask to edges of the third mask in different directions vary.

18. The method of claim 16, wherein the exit part of the at least one nozzle contacts the second damper.

19. The method of claim 16, further comprising:

forming a third damper after the forming of the exit part of the at least one nozzle, wherein the third damper contacts the exit part and the third damper and has a cross-sectional area that increases in a direction toward the second damper.

20. The method of claim 19, wherein forming the third damper comprises:

forming a fourth mask on the lower surface of the substrate to expose a surface of the exit part of the at least one nozzle; and etching the exposed surface of the exit part to form the third damper.

21. The method of claim 16, wherein forming the trenches includes removing the protecting layer and forming a fifth mask on the third mask to cover the exit part of the at least one nozzle; and etching a portion of the substrate that is exposed around the third mask to form the trenches.

22. The method of claim 21, wherein etching the substrate to form the trenches is performed by plasma dry etching.

23. The method of claim 21, wherein etching the portion of the substrate that is exposed around the third mask to form the trenches forms a nozzle wall having a thickness that increases in a direction away from the exit part of the at least one nozzle.

24. The method of claim 11, further comprising:

forming a protecting layer on the surfaces of the substrate and the inner wall surfaces and an outer wall surface of the at least one nozzle.

25. A method of manufacturing a nozzle plate, the method comprising: providing a substrate;

forming a damper part of at least one nozzle in the substrate, the damper part being formed to extend from an upper surface of the substrate towards a lower region of the substrate, the damper part being formed to have a cross-sectional area that decreases in a direction toward the lower region of the substrate, the damper part being formed to include a plurality of inner wall surfaces having different angles of inclination, the plurality of inner wall surfaces including a first inner wall surface having a first angle of inclination and a second inner wall surface having a second angle of inclination, the first and second inner wall surfaces meeting each other at a point;

forming an exit part of the at least one nozzle in a lower part of the substrate to have a constant cross-sectional area and to contact the damper part; and etching a portion of the substrate around the exit part of the at least one nozzle to form trenches.

26. The method of claim 25, wherein the exit part has a diameter of about 50 μm or greater.

27. The method of claim 25, wherein forming the damper part comprises:

forming a first mask having a first through hole on the upper surface of the substrate; and taper-etching a portion of the substrate that is exposed through the first through hole of the first mask to form the damper part.

28. The method of claim 27, wherein forming the exit part comprises:

forming a second mask having a second through hole on a lower surface of the substrate in such a manner that the second through hole corresponds to the exit part of the at least one nozzle;

forming a protecting layer on a portion of the lower surface of the substrate that is exposed around the second mask; and vertically etching a portion of the substrate that is exposed through the second through hole of the second mask to form the exit part.

29. The method of claim 28, wherein forming the trenches comprises:

removing the protecting layer and forming a third mask on the second mask to cover the exit part of the at least one nozzle; and etching a portion of the substrate that is exposed around the second mask to form the trenches.

30. The method of claim 29, wherein etching the portion of the substrate that is exposed around the second mask to form the trenches forms a nozzle wall having a thickness that increases in a direction away from the exit part of the at least one nozzle.

31. The method of claim 25, further comprising:

forming a protecting layer on the surfaces of the substrate and the inner wall surfaces and an outer wall surface of the at least one nozzle.

* * * * *